United States Patent [19]

Murray

[11] Patent Number: 4,757,498
[45] Date of Patent: Jul. 12, 1988

[54] METHOD AND APPARATUS FOR HANDLING DATA IN TELEVISION SIGNALS

[75] Inventor: Bruce Murray, Slough, England

[73] Assignee: U.S. Philips Corporation, New York, N.Y.

[21] Appl. No.: 836,032

[22] Filed: Mar. 4, 1986

[30] Foreign Application Priority Data

Mar. 12, 1985 [GB] United Kingdom ............... 8506323
Mar. 12, 1985 [GB] United Kingdom ............... 8506325
Jan. 13, 1986 [GB] United Kingdom ............... 8600713

[51] Int. Cl.⁴ .............................................. H04N 7/08
[52] U.S. Cl. ...................................... 370/94; 358/142
[58] Field of Search ............... 358/142, 147; 370/94, 370/94 U, 112

[56] References Cited

U.S. PATENT DOCUMENTS

| | | | |
|---|---|---|---|
| 3,700,793 | 10/1972 | Borsuk et al. | 358/142 |
| 3,995,119 | 11/1976 | Pachynski, Jr. | 370/112 |
| 3,995,120 | 11/1976 | Pachynski, Jr. | 370/112 |
| 4,099,259 | 7/1978 | Parsons et al. | 358/147 |
| 4,380,027 | 4/1983 | Leventer et al. | 358/142 |

FOREIGN PATENT DOCUMENTS 2516730  5/1983  France ........................ 370/94

Primary Examiner—Douglas W. Olms
Assistant Examiner—Melvin Marcelo
Attorney, Agent, or Firm—Edward W. Goodman; Gregory P. Gadson

[57] ABSTRACT

In a receiver for a C-or D-MAC Packet television signal the bits of a pocket from the first subframe (DATA 'A') are multiplexed with the bits of a correspondingly positioned packet in the second subframe (DATA 'B') and applied to a data line of a packet bus so that the bits from the two packets alternate (DATA).

1 Claim, 3 Drawing Sheets

METHOD AND APPARATUS FOR HANDLING
DATA IN TELEVISION SIGNALS

BACKGROUND OF THE INVENTION

The invention relates to a method of handling data in a received television signal of the MAC packet type which television signal is in time multiplexed component form the majority of the line periods of a television frame of which contain a digital data burst component and a vision component, the data burst component comprising first and second adjacent sub-components with said first and said second sub-components in each frame forming the data in respective first and second sub-frames which data in each subframe is organized as a packet multiplex. The invention relates to apparatus for use with the above method.

Television signals of the MAC packet type are described in the European Broadcasting Union documents SPB 284, 3rd revised version "Television Standards for the Broadcasting Satellite Service Specification of the C-MAC Packet System", December 1984 and SPB 352 "Methods of conveying C-MAC Packet Signals in Small and Large Community Antenna and Cable Network Installations, December, both of which are incorporated herein by way of reference. For the C- and D-MAC Packet systems the data is contained within two B subframes in each television frame and data relating to a particular service may be contained in one such subframe or both subframes. It is necessary for the data from both subframes to be readily available for recovery devices for the data and at the same time keep the connections necessary to a minimum especially as the formation and recovery of the packets will be performed by different integrated circuits.

SUMMARY OF THE INVENTION

It is an object of the invention to provide a method and apparatus for handling such data while keeping such connections to a minimum.

The invention provides a method of handling data in a received television signal of the MAC packet type which television signal is in time multiplexed component form the majority of the line periods of a television frame of which contain a digital data burst component and a vision component, the data burst component comprising first and second adjacent sub-components with said first and said second sub-components in each frame forming the data in respective first and second sub-frames which data in each subframe is organized as a packet multiplex, characterized in that said method comprises the steps of:

i. extracting said data burst from said received television signal;

ii. forming the data in the extracted data bursts into individual packets associated with the first or the second subframe; and iii. applying correspondingly positioned packets from the respective subframes substantially simultaneously to a common data line with the bits from a packet of the first subframe alternating with the bits from the packet of the second subframe.

Thus with the present method only one data line is required to convey packets from both subframes.

The invention also provides apparatus for handling data in a television signal of the MAC packet type which television signal is in time multiplexed component form the majority of the line periods of a television frame of which contain a digital data burst component and a vision component, the data burst component comprising first and second adjacent sub-components with said first and said second sub-components in each frame forming the data in respective first and second sub-frames which data in each subframe is organized as a packet multiplex, characterized in that said apparatus comprises means for extracting said data burst from said television signal when received, means for forming the data in the extracted data bursts into individual packets associated with the first or the second subframe, and means for applying correspondingly positioned packets from the respective subframes substantially simultaneously to a common data line with the bits from a packet of the first subframe alternating with the bits from the packet of the second subframe.

The means for forming the data into individual packets may comprise a sound/data FIFO in which the data rate is reduced as compared with that in the received signal and a de-interleaving random access memory.

BRIEF DESCRIPTION OF THE DRAWINGS

The above and other features of the invention will now be described with reference to the accompanying drawings, in which.

DETAILED DESCRIPTION OF THE INVENTION

Figure 1:
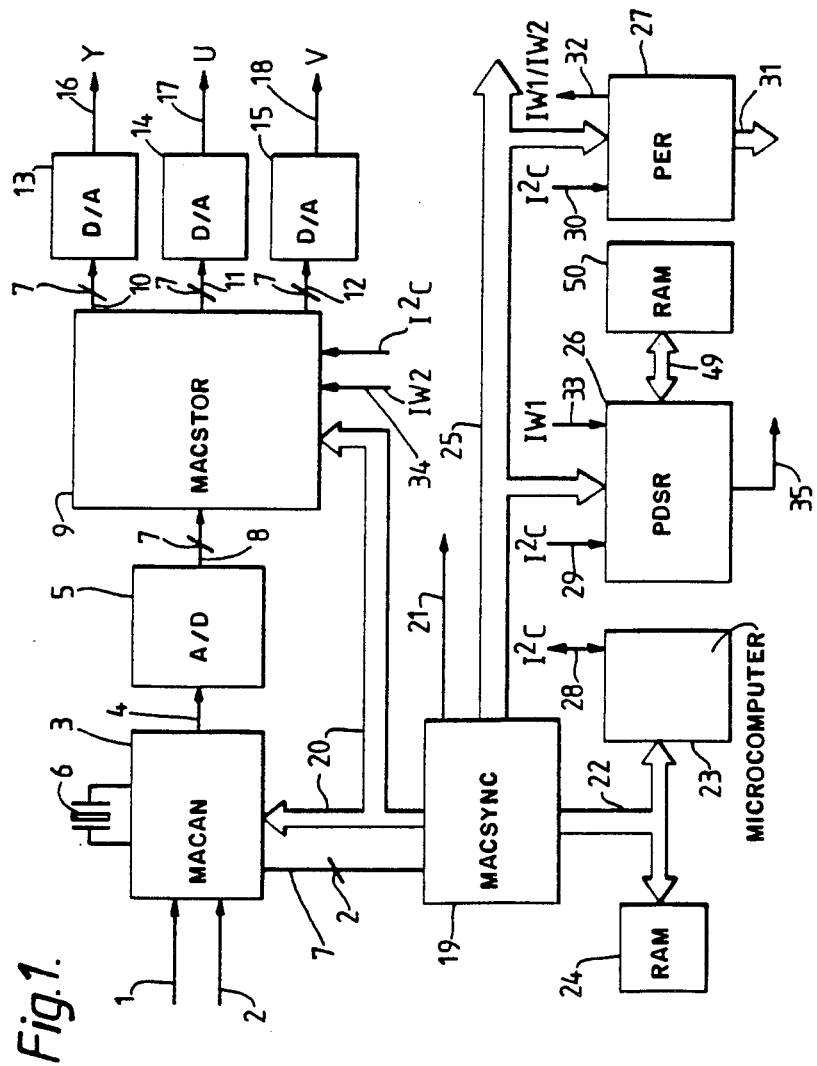
FIG. 1 is a block diagram of a receiver using the method and apparatus according to the invention.

FIG. 1 shows a block diagram of a decoder for a MAC television signal of the C-MAC type as described in the above mentioned European Broadcasting Union document SPB 284 or D-MAC type as described in the above mentioned European Broadcasting Union document SPB 352. In the Figure a first input lead 1 carries demodulated video signals whilst a second input lead 2 carries demodulated data signals which leads, in the case of C-MAC, can be fed from separate demodulators while in the case of signals with type B modulation (D-MAC) can be connected together. The two input leads are assumed to convey video and data signals which are time coincident at the demodulator outputs which establishes a time datum relative to which any differential path delays can be calculated. These input leads are connected to a first unit (MACAN) 3 which performs a number of analog functions on the applied signals. The video signal is clamped within unit 3 from whence it is applied via a connection 4 to a suitable analog-to-digital (A/D) converter 5 for digitization, a suitable A/D converter being the Philips type PNA 7507. In the unit 3 the data signal is subjected to a slicing action whilst data transition detection enables a 20.25 MHz master clock to be phase locked to the incoming data, a 20.25 MHz crystal 6 being connected to the unit 3 for this purpose. Binary resynchronized data, decoded from duobinary if necessary, together with a clock signal derived from the master clock are taken from the unit 3 by way of a connection 7.

The digitized video signal from the A/D converter 5 in the form of 7-bit digitized video samples at a rate of 20.25 MHz are passed via a connection 8 to a further unit (MACSTOR) 9 in which the video signal is subjected to decompression and descrambling to produce parallel luminance Y and chrominance U/V samples at respective rates of 13.5 MHz and 6.75 MHz. The Y, U and V samples are conveyed from unit 9 via connections 10, 11 and 12 to respective suitable digital-to-analog (D/A) converters 13, 14 and 15, such as the Philips type PN 7518. The analog outputs of the D/A converters 13, 14, 15 appear on respective Y, U and V output connections 16, 17 and 18 for subsequent matrixing to produce red, green and blue (R,G,B,) signals, the matrixing being implemented either by fairly simple transistor circuitry or by the use of an integrated circuit such as the Philips type TDA 8461.

The connection 7 carrying the binary data and clock signal from the unit 3 is applied to a sync. and data extraction unit (MACSYNC) 19 in whose digital circuitry the synchronizing information contained in the MAC signal is extracted. This circuitry operates in two stages, first obtaining line sync. by detecting and windowing the 6-bit line sync. words W1, W2 and subsequently obtaining frame sync. by examining the W1/W2 line sync. word sequence. Digital flywheel circuits continously check that sync., once acquired, is being maintained. Once overall sync. is obtained a local timing chain provides all the system timing. System timing is applied to the MACAN unit 3 and the MACSTOR unit 9 by way of timing interconnections 20. Sync. signals for the display of the R,G,B, signals are taken from the MACSYNC unit 19 by way of a connection 21.

The MACSYNC unit 19 has two other main functions. An 8-bit data bus 22 conveys system interpretation (SI) information (line 625 data, packet '0' and relevant BI packets) to a microcomputer 23 and its random access memory (RAM) 24. In addition the data forming the packet multiplex in the MAC signal (lines 1-623 giving 82 packets per subframe) is processed to format and drive a packet bus 25. This bus effectively comprises two serial data lines, one for each subframe though in practice multiplexed to save pins, accompanied by a 6.75 MHz clock signal and a validation signal. The data format for each line is that of serial de-interleaved packet length bursts transmitted at a net rate of 3.375 Mbits/s. Energy dispersal descrambling is also applied within the MACSYNC unit 19 so that packet bus data is 'literal' unless conditional access scrambling has been applied.

The use of the packet bus 25 allows the recovery of any service within the multiplex by connecting an appropriate service decoder (a service recovery device) to the bus. This gives a building block structure for data decoding enabling a setmaker to provide as many chosen simultaneous services as required simply by duplicating recovery devices. As an example, as well as a sound output to accompany the video signal, the decoder for a MAC receiver could also provide a radio sound output which could be available simultaneously with the video signal sound output simply by duplicating the sound recovery device. Such a packet bus also allows for the future addition of new defined services e.g. packet teletext or packet telesoftware where upon it would only be necessary to develop appropriate recovery devices for these new services.

The above EBU documents SPB 284 and SPB 352 currently describe two services for which it is possible to define recovery devices, these being packet digital sound and an encryption data service for conditional access purposes, these being described in parts 3 and 5 respectively of these EBU documents. FIG. 1 therefore shows two suitable recovery devices connected to the packet bus 25 these being a packet digital sound recovery device (PDSR) 26 and a packet encryption recovery device (PER) 27. Each recovery device connected to the packet bus is, in operation, programmed with the packet address corresponding to the service or services selected by the user and the set management software would, of course, render this process transparent. These packet addresses are obtained by the software interpretation of packet '0' information by the microcomputer 23, and the programming of the packet addresses, together with any interpretation control necessary to ensure correct service decoding e.g. for the PDSR device 26—information about the sound coding employed and whether mono/stereo etc, are performed via an $I^2C$ bus shown connected to the microcomputer 23 by the connection 28 and to the PDSR device 26 and the PER device 27 by the respective connections 29 and 30. As the encryption service is carried on two packet addresses the PER device 27 will need to be programmed with both of these.

The recovery devices compare the address of each packet on the packet bus 25 with their pre-programmed values, accepting for processing only those packets where the addresses agree (after Golay (23, 12) code error correction). The packet addresses on the packet bus 25 are monitored simultaneously by all recovery devices; this means that a packet from a specific service can be accepted from the corresponding packet position in either subframe of a C-MAC or D-MAC signal. This allows broadcasters almost transparent use of the total multiplex capacity of a C-MAC or D-MAC signal, despite its physical organization as two data subframes. It should be noted that the EBU documents SPB 284 and SPB 352 do not allow packets conveying the same service component to occupy the same relative position in each subframe.

Although the data capacity of each subframe is just over 1.5 Mbits/s, the considerably higher transmission rate of 3.375 Mbits/s is used on each effective data line of the packet bus. This is entirely intentional, it means that in practice large gaps (on average just under 900 bit periods at 3.375 MHz in duration) appear between valid data. These gaps are used by the MACSYNC unit 19 in the porting of BI packets to the RAM 24, the method of use being as described in our co-pending patent application No. 8506322 (PHB 33144).

The management of conditional access to the video and data signals is still the subject of widespread discussion among broadcasters, setmakers and programme companies alike. Part 5 of the EBU documents SPB 284 and SPB 352 define, of course, the service scrambling methods to be used but state clearly that the actual subsystem used for "business management" is outside the scope of standardization. An interface concept (the "EBU standard interface") is described; this conceptual interface (which need not coincide with any physical boundary in the receiver) is considered to represent the limit of standardization. The role of the PER device 27, as proposed, is to take encryption data packets from the packet bus 25 and present the raw data content of these in a specific interface format. At the same time it accepts from a controlled access (CA) subsystem (not shown) via a connection 31 the control words CW1 and CW2 used to seed the descrambling pseudorandom binary sequence (PRBS) generators every 256 television frames. Because all the conditional access descrambling facilities (PRBS 1/3 in the PDSR device 26 and PRBS 2 in the MACSTOR unit 8) are provided locally within the recovery devices simultaneous descrambling of separately scrambled service sets is possible. To achieve this initialization words IW1 and IW2 produced by the PER device 27 are applied via a connection 32 to respective connections 33 and 34 for application to the PDSR device 26 and the MACSTOR unit 8. A further data input/output bus 49 connects the PDSR 26 with an external buffer random access memory (RAM) 50. The descrambled data from the PDSR device 26 is derived therefrom by means of an I²S connection 35.

Figure 2:
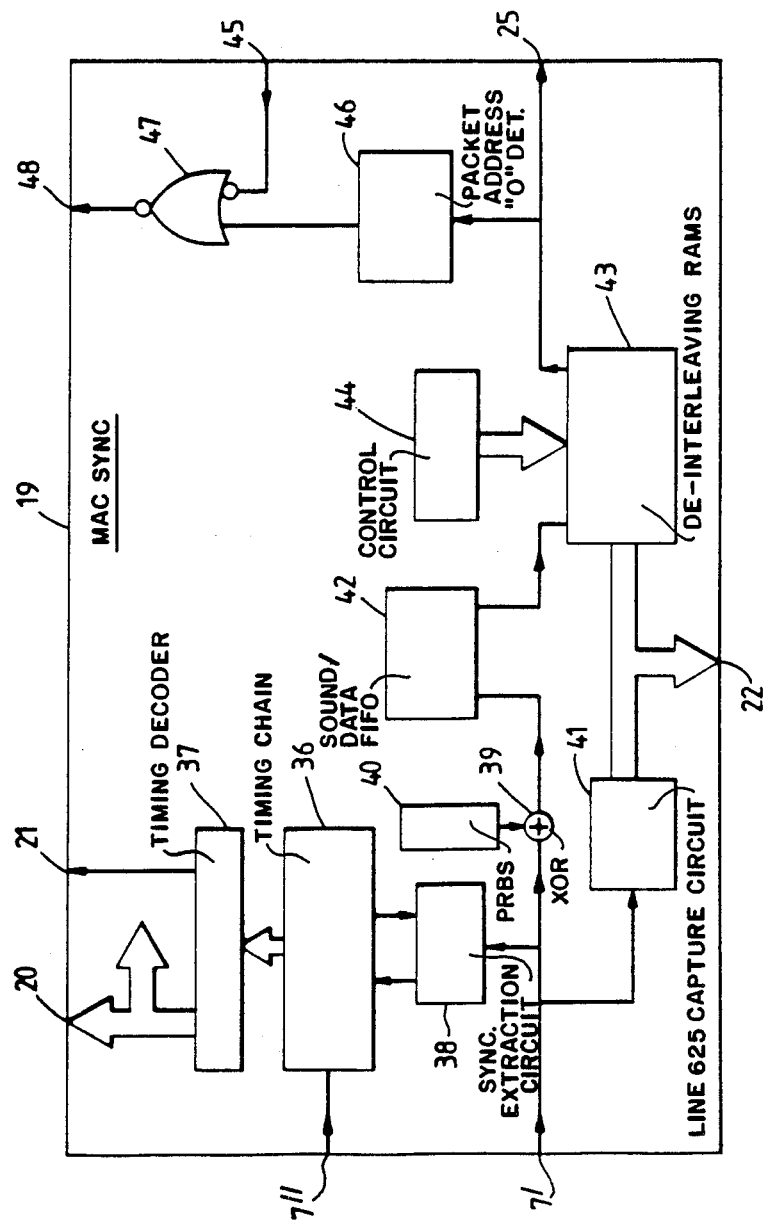
FIG. 2 is a block diagram of a sync. and data extraction unit for use with the receiver of FIG. 1.

FIG. 2 shows in detail some of the components of the MACSYNC unit 19, like references to those used in FIG. 1 indicating like components. In FIG. 2 the connection from the MACAN unit 3 conveying the data and clock signal is divided and shown as two input connections 7' and 7" respectively. The 20.25 MHz clock signal is applied from input connection 7" to a timing chain 36 which consists of horizontal (÷1296) and vertical (÷625) counters. From the timing chain 36 all the system timing is derived by means of a timing decoder 37, this timing not only being used within the MACSYNC unit 19 but also outside it by way of the timing interconnections 20 and the connection 21 for display sync. Counters in the timing chain 36 are preset into a known timing relationship to the incoming signal by means of a sync. extraction circuit 38 which also includes a digital flywheel which checks that sync., once acquired, is being maintained. The sync. information present on the incoming data at input connection 7' is therefore applied to an input of the sync. extraction circuit 38 to establish the above timing relationship.

For energy dispersal purposes the incoming data is scrambled prior to transmission and in order to descramble it the scrambled data is applied to a first input of an exclusive OR (EX OR) gate 39 a second input of which is connected to a pseudo-random binary sequence (PRBS) generator 40 which generator is defined in the B above mentioned EBU documents SPB 284 and SPB 352. The data in line 625 is not subjected to energy dispersal scrambling and therefore does not require such descrambling. Line 625 data is therefore captured prior to the descrambling process by a line 625 capture circuit 41 where it is formatted into 8 bit words prior to application to the data bus 22. The descrambled data bursts from the other lines are applied from the output of the EX OR gate 39 to a sound/data FIFO 42 where the data is expanded from its high input rate to a lower and more manageable rate. The data at this lower rate is then applied to de-interleaving random access memories (RAM's) 43, these RAM's, under the control of control circuitry 44, producing outputs for the packet bus 25 in which the bits are in their correct time sequence. In addition the BI packets, when detected and in the presence of a BI packet detected signal at an input connection 45, can be transferred to the microcomputer 23 by way of the data bus 22 as can packets of address '0' when their presence is detected by a packet address '0' detector 46. When such a presence is detected the output of the packet address '0' detector 46 produces a 'high' signal which is applied to a first input of a NOR gate 47, whose output is normally 'high', to render that output 'low' which is provided at the unit output 48. The output 48 is connected to the microcomputer 23 (FIG. 1) and is used to signal that this packet '0' should be loaded into the RAM 24 by way of the data bus 22. The BI packet detected signal at input 45 goes 'low' in the presence of a BI packet and similarly causes the output of the NOR gate 47 to go 'low' to cause the BI packet to be loaded into the RAM 24 in a similar way.

Figure 3:
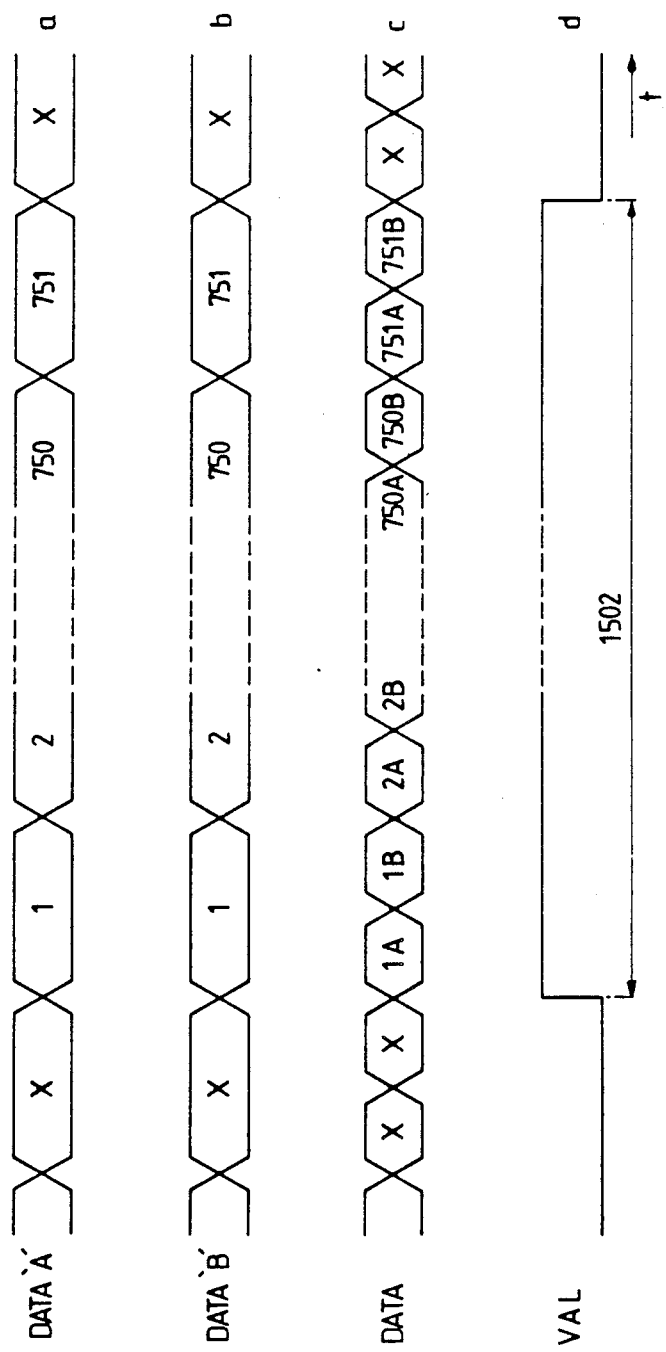
FIG. 3 shows waveforms for the operation of the invention.

FIG. 3 is a time diagram showing how the bits from the subframe packets are multiplexed onto the data line of the packet bus 25 of FIG. 1. FIG. 3a shows the bits 1 to 751 of a packet from one of the subframes (DATA 'A') whilst FIG. 3b shows the bits from the correspondingly occurring packet from the other of the subframes (DATA 'B') as present at the RAM's 43 in the MACSYNC unit 19 of FIG. 2. FIG. 3c shows the data bits as they are multiplexed from the RAM's 43 onto the data line of the packet bus 25, each bit being of half the duration of that shown in FIGS. 3a and 3b with the bits being alternately derived from the two subframes (DATA 'A' and DATA 'B'). Although the bit rate of the data present on the packet bus 25 is 6.75 Mbits/s (and hence the need for a 6.75 MHz clock signal) the instantaneous data rate for a packet from one of the subframes is 3.375 Mbits/s. The validation signal VAL shown in FIG. 3d indicates the packet period during which the interleaved packets are valid (1502 clock periods at 6.75 MHz) in view of the gap between adjacent pairs of packets as described in our above mentioned co-pending application No. 8506322.

As the MACSYNC unit 19 will be in the form of an integrated circuit it will be appreciated that the multiplexing of the packets from the two subframes reduces from two to one the number of pins required to extract that data from such an integrated circuit. The recovery devices PDSR 26 and PER 27 are adapted to select the bits from the required packet irrespective of which subframe it appears in.

I claim:

1. Apparatus for handling data in a television signal of the MAC packet type which television signal is in time multiplexed component form the majority of the line periods of a television frame of which contain a digital data burst component and a vision component, the data burst component comprising first and second adjacent sub-components with said first and said second sub-components in each frame forming the data in respective first and second subframes which data in each subframe is organized as a packet of multiplexed data, characterized in that said apparatus comprises means for extracting said data burst from said television signal when received, means for forming the data in the extracted data bursts into individual packets associated with the first or the second subframe comprising a sound/data FIFO in which the data rate is reduced as compared with that in the received signal and a de-interleaving random access memory, and means for applying correspondingly positioned packets from the respective subframes substantially simultaneously to a common data line with the bits from a packet of the first subframe alternating with the bits from the packet of the second subframe.

* * * * *